United States Patent [19]

Zeitler et al.

[11] Patent Number: 4,597,927
[45] Date of Patent: Jul. 1, 1986

[54] TWO-STAGE PROCESS FOR THE PREPARATION OF THERMOPLASTIC POLYURETHANE ELASTOMERS

[75] Inventors: Gerhard Zeitler, Hessheim; Frank Werner, Neustadt; Gerhard Bittner, Diepholz; Karl-Heinz Baumann, Battenberg; Artur Roeber, Ludwigshafen; Lothar Metzinger, Osnabrück; Rainer Ohlinger, Heidelberg; Hans D. Zettler, Grünstadt, all of Fed. Rep. of Germany

[73] Assignee: BASF Aktiengesellschaft, Ludwigshafen, Fed. Rep. of Germany

[21] Appl. No.: 504,795

[22] Filed: Jun. 16, 1983

[30] Foreign Application Priority Data

Jun. 30, 1982 [DE] Fed. Rep. of Germany ....... 3224324

[51] Int. Cl.$^4$ ................. B29C 47/00; B29C 71/00; B02C 18/14; B02C 23/24
[52] U.S. Cl. ..................................... 264/85; 264/141; 264/176 R; 264/221; 264/331.19; 264/DIG. 44; 264/DIG. 69; 425/DIG. 12; 425/DIG. 46; 528/65; 528/83
[58] Field of Search ........... 264/140, 176 R, 221, 264/DIG. 44, DIG. 69, 331.19, 37, 85, 141; 528/83, 65; 425/DIG. 12, DIG. 46

[56] References Cited

U.S. PATENT DOCUMENTS

| | | | |
|---|---|---|---|
| 3,170,972 | 2/1965 | Knipp et al. | 264/176 R |
| 3,192,185 | 6/1965 | Achterhof et al. | 264/176 R X |
| 3,192,293 | 6/1965 | Van Riper | 425/DIG. 46 |
| 3,233,025 | 2/1966 | Frye et al. | 264/176 R |
| 3,312,666 | 4/1967 | Knipp et al. | 525/65 X |
| 3,422,066 | 1/1969 | Britain | 528/65 |
| 3,501,564 | 3/1970 | Snoeyenbos et al. | 264/331.9 X |
| 3,642,964 | 2/1972 | Rausch, Jr. et al. | 528/83 X |
| 3,773,586 | 11/1973 | Koch et al. | 264/37 X |
| 3,819,773 | 6/1974 | Pears | 264/37 |
| 3,843,060 | 10/1974 | Colburn | 264/37 X |
| 3,933,937 | 1/1976 | Rhodes, Jr. et al. | 528/65 X |
| 4,009,235 | 2/1977 | Bober | 264/37 X |
| 4,013,745 | 3/1977 | Brinkmann et al. | 264/37 |
| 4,045,535 | 8/1977 | Putzer | 264/331.9 X |
| 4,089,918 | 5/1978 | Kato et al. | 264/216 X |
| 4,098,996 | 7/1978 | Ryan et al. | 264/37 X |
| 4,110,420 | 8/1978 | Turner | 264/DIG. 69 |
| 4,302,497 | 11/1981 | Toyooka et al. | 264/216 X |

FOREIGN PATENT DOCUMENTS 1057018  2/1967  United Kingdom ........... 264/176 R

Primary Examiner—Philip Anderson
Attorney, Agent, or Firm—Norbert M. Lisicki

[57] ABSTRACT

In order to prepare thermoplastic polyurethane elastomers (a) organic diisocyanate,
(b) polyhydroxyl compounds with molecular weights of 500 to 8,000, and
(c) chain extenders with molecular weights of 60 to 400 in the presence of
(d) catalysts, and optionally
(e) auxiliaries, and/or
(f) additives are reacted in two reaction stages at temperatures from 60° C. to 250° C. In the first reaction stage the components are continuously mixed, the reaction mixture is applied to a carrier, preferably a conveyor band of thermoplastic material, and is allowed to react at the reaction temperature until solidified. Subsequently, the solidified reaction mixture is melted in an extruder and the reaction is completed in the second reaction stage.

8 Claims, 1 Drawing Figure

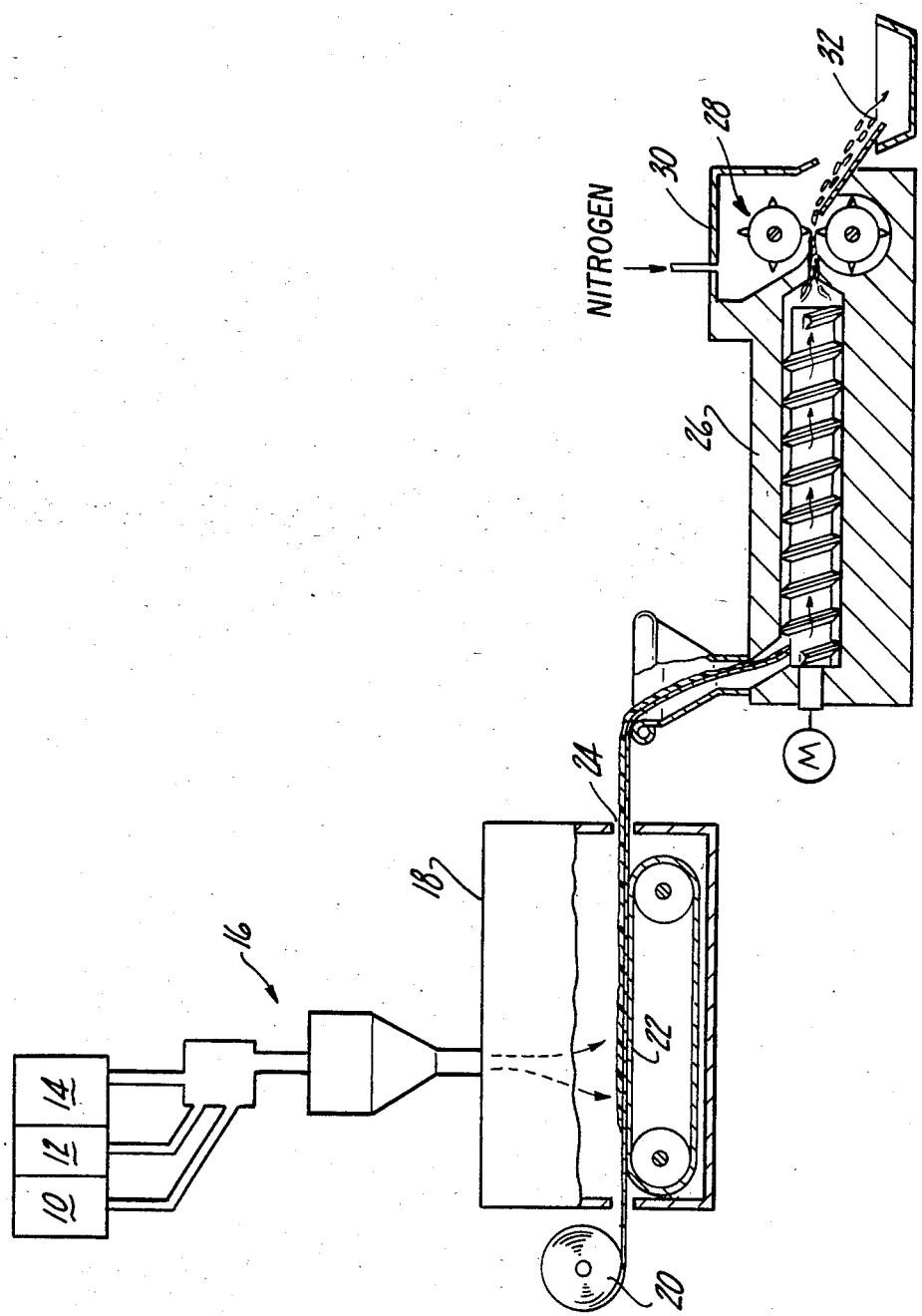

TWO-STAGE PROCESS FOR THE PREPARATION OF THERMOPLASTIC POLYURETHANE ELASTOMERS

BACKGROUND OF THE INVENTION

1. Field of the Invention

This invention relates to a process for the preparation of thermoplastic polyurethane elastomers.

2. Prior Art

Thermoplastic polyurethane elastomers have been known for a considerable length of time. Their technical importance is based on a combination of high grade mechanical properties, together with the advantages of costeffective thermoplastic processing methods.

By using varying chemical components, a great variety of mechanical properties can be achieved. An overview of thermoplastic polyurethane elastomers, their properties and applications, is given in Kunststoffe 68 (1978), pages 819–825. Thermoplastic polyurethane elastomers may be prepared continuously or on a batch-type basis, employing various methods. As well known, the so-called band method and the extrusion processes are used on an industrial scale also.

According to British Patent No. 1,057,018, a prepolymer is produced from a basically linear polyhydroxyl compound and excess organic diisocyanate. Via metering pump this prepolymer is introduced into a mixing head where it is mixed with a certain amount of a low molecular diol. The resultant reaction mixture is fed onto a conveyor band and is transported through an oven heated to a temperature of 70° C. to 130° C. until it solidifies. The reaction product is subsequently subjected to a size reduction process and is tempered at a temperature up to 120° C. for periods of 6–40 hours. Thus the product can be processed into molded parts, for example, using injection molding machines. The post-tempering and size-reduction processes have a detrimental economical effect on the band method.

In the case of the extruder process, such as described for example in German Published Application No. 20 59 570 (U.S. Pat. No. 3,642,964), the components are directly introduced into the extruder and the reaction is carried out in the extruder under certain process conditions. The resultant polyurethane elastomer is transformed into a thermoplastic state, is extruded, is cooled to solidification in an inert gas atmosphere and is subjected to a size-reduction process. The drawback of this process is that the resultant thermoplastic polyurethane elastomers are not suited for the preparation of films or of fine profiles and hoses. Thermoplastic polyurethane elastomers of the same composition are transparent when prepared according to the extruder method, whereas they are opaque if produced according to the band method. Opaque thermoplastic polyurethane elastomers can be processed into films which do not display any blocking, whereas transparent thermoplastic polyurethane elastomers are not suited for this application. The drawback of the band method, however, is the cost.

BRIEF DESCRIPTION OF THE DRAWING

The FIGURE is a side elevation of a schematic representation showing one method for producing thermoplastic polyurethane elastomers in accordance with the present invention.

DESCRIPTION OF THE PREFERRED EMBODIMENTS

The purpose of this invention was to prepare thermoplastic polyurethane elastomers by an economical process having improved mechanical properties which can be further processed into molded parts corresponding with the thermoplastic polyurethane elastomers obtained by the band method.

Surprisingly, this requirement could be met by a method for the preparation of thermoplastic polyurethane elastomers by reacting (a) organic diisocyanates,
(b) polyhydroxyl compounds with molecular weights of 500–8,000, and
(c) chain extenders with molecular weights of 60–400, in the presence of
(d) catalysts, and optionally
(e) auxiliaries, and/or
(f) additives, at temperatures from 60° C. to 250° C., wherein the reaction is carried out in two stages with components (a) through (d) and optionally (e) and/or (f) being continuously mixed in the first reaction stage with the reaction mixture being fed onto a carrier and allowed to react until solidified, and wherein subsequently, the solidified reaction mixture is melted in an extruder in the second reaction stage and the reaction is completed.

As shown in the FIGURE, chambers 10, 12, and 14 feed organic diisocyanate, polyhydroxyl compounds with molecular weights of 500 to 8000 and chain extenders with molecular weights of 60 to 400 mixed with catalysts, respectively, into mixing head 16. This reaction mixture is deposited onto thermoplastic foil 20 being fed by conveyor band 22. Polyurethane product 24 together with foil 20 is passed through heating zone 18 by means of conveyor band 22 into heated extruder 26. The extrudate passes through inert gas zone 30 and is granulated by die granulator 28 resulting in granulated particles 32.

The process of this invention offers the advantage that it results in thermoplastic polyurethane elastomers with excellent mechanical properties similar to the band method and that it simultaneously offers high yields. Since the exothermal polyurethane polyaddition reaction is carried out on a carrier, preferably a conveyor band of thermoplastic material, the addition and removal of heat, and thus the course of the reaction, can be controlled as a function of the applied components and their quantities. Thus, only the product of the final reaction to thermoplastic polyurethane elastomers and plastification is moved to the extruder.

Examples of organic diisocyanates which may be employed in accordance with the invention include aliphatic, cycloaliphatic and preferably aromatic diisocyanates. These include: aliphatic diisocyanates such as hexamethylene diisocyanate, cycloaliphatic diisocyanates such as isophorone diisocyanate, 1,4-cyclohexane diisocyanate, 1-methyl-2,4- and -2,6-cyclohexane diisocyanate, as well as the corresponding isomer mixtures, 4,4'-, 2,4'- and 2,2'-dicyclohexylmethane diisocyanate and the corresponding isomer mixtures, and preferably aromatic diisocyanates such as 2,4-toluene diisocyanate, mixtures of 2,4- and 2,6-toluene diisocyanate, 4,4'-, 2,4'- and 2,2'-diphenylmethane diisocyanate, mixtures of 4'- and 4,4'-diphenylmethane diisocyanate, urethane modified liquid 4,4'- and/or 2,4'-diphenylmethane diisocyanate and 1,5-naphthylene diisocyanate. Preferably used are hexamethylene diisocyanate, isophorone diisocyanate, diphenylmethane diisocyanate isomer mixtures with a 4,4'-diphenylmethane diisocyanate content greater than 96 weight percent, and particularly 4,4'-diphenylmethane diisocyanate and 1,5-naphthylene diisocyanate.

Preferred examples of higher molecular polyhydroxyl compounds with molecular weights of 500 to 8,000 are polyoxyalkylene polyether polyols, and particularly polyester polyols. However, other suitable hydroxyl group-containing polymers include polyacetals such as polyoxymethylenes and primarily water-insoluble formals such as polybutanediol formal and polyhexanediol formal and polycarbonates, particularly those prepared from diphenylcarbonate and 1,6-hexanediol by transesterification. The polyhydroxyl compounds must be at least predominantly linear, that is, they must have a difunctional structure. The cited polyhydroxyl compounds may be used individually or as mixtures.

Suitable polyoxyalkylene polyether polyols may be prepared by reacting one or more alkylene oxides with 2 to 4 carbon atoms in the alkylene radical with an initiator molecule which contains two active hydrogen atoms. Suitable alkylene oxides include ethylene oxide, 1,2-propylene oxide, 1,2- and 2,3-butylene oxide as well as epichlorohydrin. Preferably used are ethylene oxide and mixtures of propylene oxide and ethylene oxide. The alkylene oxides may be used individually, alternatingly in sequence, or as mixtures. Suitable initiator molecules include: water, amino alcohols such as N-alkyldiethanol amines, for example, N-methyldiethanol amine and diols such as ethylene glycol, trimethylene glycol, 1,4-butanediol and 1,6-hexanediol. Optionally, mixtures of initiator molecules may also be used. Other suitable polyether polyols include the hydroxyl group-containing polymerization products of tetrahydrofuran.

Preferably used are hydroxyl group-containing polytetrahydrofuran and polyoxyalkylene polyether polyols of propylene oxide and ethylene oxide where more than 50 percent, preferably 60 to 80 percent of the hydroxyl groups are primary hydroxyl groups, and where at least part of the ethylene oxide is present as a terminal block.

Such polyoxyalkylene polyether polyols may be obtained, for example, by the initial addition of propylene oxide to the starter molecule and then subsequently adding the ethylene oxide, or by the initial addition of the entire amount of propylene oxide mixed with part of the ethylene oxide, and to subsequently add the rest of the ethylene oxide, or by the initial addition of part of the ethylene oxide to the initiator molecule and followed by the entire amount of propylene oxide, and then the addition of the remainder of the ethylene oxide.

The basically linear polyoxyalkylene polyether polyols have molecular weights from 500 to 8,000, preferably 600 to 6,000, and particularly 800 to 3,500. They may be used individually as well as in the form of mixtures.

Suitable polyester polyols may be prepared, for example, by the reaction of dicarboxylic acids with 2 to 12 carbon atoms and multifunctional alcohols. Suitable dicarboxylic acids include, for example: aliphatic dicarboxylic acids such as succinic acid, glutaric acid, adipic acid, subaric acid, azelaic acid and sebacic acid, and aromatic dicarboxylic acids such as phthalic acid, isophthalic acid and terephthalic acid. The dicarboxylic acids may be used individually or as mixtures, for example in the form of a succinic, glutaric and adipic acid mixture. For the preparation of the polyester polyols it may optionally be advantageous to use transesterification techniques employing acid esters containing from 1 to 4 carbon atoms in the alcohol radical. Carboxylic acid anhydrides or carboxylic acid chlorides may also be employed. Examples of multifunctional alcohols are glycols with 2 to 16 carbon atoms such as ethylene glycol, diethylene glycol, 1,4butanediol, 1,5-pentanediol, 1,6-hexanediol, 1,10-decanediol, 2,2-dimethyl propanediol-1,3, trimethylene glycol and dipropylene glycol. Depending upon the desired properties, the multifunctional alcohols may be used alone or optionally, in mixtures.

Also suited are esters of carbonic acid with the cited diols, particularly those with 4 to 6 carbon atoms, such as 2,4-butanediol and/or 1,6-hexandiol, condensation products of ω-hydroxycarboxylic acids, such as ω-hydroxycapronic acid and preferably polymerization products of lactones, for example, optionally substituted ω-caprolactones.

Preferably used as polyester polyols are ethanediol-polyadipates, 1,4-butanediol-polyadipates, ethanediol-butanediol-polyadipates, 1,6-hexanediol-neopentyl-glycolpolyadipates, 1,6-hexanediol-1,4-butanediol-polyadipates, and polycaprolactones.

The polyester polyols have molecular weights from 500 to 6,000, preferably from 800 to 3,500.

Preferably used as chain extenders with molecular weight from 60 to 400, preferably 60 to 300, are aliphatic diols with 2 to 12 carbon atoms, preferably with 2, 4 or 6 carbon atoms, such as ethanediol, 1,6-hexanediol, diethylene glycol, dipropylene glycol and particularly 1,4-butanediol. However, also suitable for this purpose are diesters of terephthalic acid with glycols having 2 to 4 carbon atoms, such as terephthalic acid-bis-ethylene glycol or -1,4-butanediol, hydroxyalkylene ethers of hydroquinone such as 1,4-di-(β-hydroxyethyl)-hydroquinone, additionally (cyclo)aliphatic diamines, such as isophorone diamine, ethylene diamine, 1,2-, 1,3-propylene diamine, N-methylpropylene diamine-1,3, N,N'dimethyl-ethylene diamine, and aromatic diamines such as 2,4- and 2,6-toluene diamine, 3,5'diethyl-2,4- and -2,6-toluene diamine, and primary ortho-di-, tri- and/or tetraalklyl-substituted 4,4'-diaminodiphenylmethane.

To adjust the hardness and melting point of the thermoplastic polyurethane elastomers, components (b) and (c) may be varied within relatively wide molar ratios. Molar ratios of polyhydroxyl compounds (b) to chain extenders (c) of 1:1 to 1:12, particularly of 1:1.8 to 1:4.4, have proven to work well. The hardness and the melting point of the thermoplastic polyurethane elastomers increases with increasing diol content.

To prepare the thermoplastic polyurethane elastomer components (a), (b), and (c), are reacted in the presence of catalysts (d) and optionally auxiliaries (e) and/or additives (f), in such quantities that the equivalent ratio of isocyanate groups to the hydroxyl group or the sum of hydroxyl and amino groups of components (b) and (c) is 1:085 to 1.20, preferably 1:095 to 1:1.05 and more preferably about 1:1.02.

Suitable catalysts which may be employed are those commonly used such as triethyl amine, dimethylcyclohexyl amine, N-methyl morpholine, N,N'-dimethylpiperazine, diazabicyclo-(2,2,2)-octane, and similar substances, as well as organic metal compounds such as titanic acid esters, iron compounds, tin compounds such as tin acetate, tin dioctoate, tin dilaurate or the tin dialkyl salts of aliphatic carboxylic acids such as dibutyltin diacetate, dibutyltin dilaurate, and similar substances. The catalysts are commonly used in amounts of 0.001 to 0.1 parts per 100 parts of polyhydroxyl compound.

In addition to catalysts, auxiliaries (e) and/or additives (f), may be incorporated in the compounds. Examples include lubricants, inhibitors, stabilizers against hydrolysis, light, heat or discoloration, flame retardants, dyes, pigments, inorganic and/or organic fillers and reinforcing agents.

The literature contains additional data on the above cited auxiliaries and additives such as the monograph by J. H. Saunders and K. C. Frisch "High Polymers," volume XVI, Polyurethanes, parts 1 and 2, Interscience Publishers 1962 and/or 1964, or German Published Application No. 29 01 774.

Specifically, the thermoplastic polyurethane elastomers are prepared as follows using the process of this invention:

In the first reaction stage, components (a) through (d) and optionally (e) and/or (f) are continuously mixed by means of a mixing head at temperatures above the melting point of components (a) through (c). The reaction mixture is applied to a carrier, preferably a conveyor band, and is transported through a heated zone of 1 to 20 meters in length, preferably 3 to 10 meters in length, at a rate of 1 to 20 meters per minute, preferably of 4 to 10 meters per minute. The reaction temperature in the heated zone is 60° C. to 200° C., preferably 100° C. to 180° C. Dependent upon the amount of diisocyanate in the reaction mixture, the reaction is controlled by cooling or heating in such a manner that more than 50 mole percent, preferably more than 80 mole percent of diisocyanate are converted during the first reaction stage and that the reaction mixture solidifies at the desired reaction temperature.

Since the solidified reaction mixture has only a relatively low stability, it has proven to be advantageous to carry out the reaction on a carrier and to use for this purpose a foil or a band of thermoplastic material in form of a conveyor band and to introduce the carrier as a transportation aid into the extruder of the second reaction stage. Particularly those thermoplastic materials which are well miscible with thermoplastic polyurethane elastomers such as thermoplastic polyurethane with a low urethane content or polyamide have proven to work well as carrier materials. Since the carrier foils or bands are very thin for example 0.01 to 0.08 millimeters, the amount of thermoplastic material in the thermoplastic polyurethane elastomers is so small that it is negligible and that an impairment of the mechanical properties of the end product was not realized.

The reaction mixture of the first reaction stage which solidifies on the carrier is introduced in an extruder in the second reaction stage, preferably together with the carrier and the polyaddition reaction is completed. Since the solidified reaction mixture is introduced into the extruder at relatively high temperares, for example at temperatures of 100° C. to 200° C., only a slight shear energy, normally 40 to 120 kJ is necessary for melting. Depending upon the diisocyanate content of the thermoplastic polyurethane elastomers, the residence time in the extruder is 0.5 to 15, preferably 1 to 6 minutes at reaction temperatures of 140° C. to 250° C., preferably 160° C. to 230° C. At the extruder outlet the completed thermoplastic polyurethane elastomer is finished in an inert gas atmosphere, for example, in nitrogen by die-face granulation.

The thermoplastic polyurethane elastomers prepared according to this invention have very good mechanical properties and are particularly well suited for the preparation of polyurethane foils and other molded parts.

EXAMPLE 1

A mixture of 100 parts by weight of a poly-1,4-butanediol adipate having a hydroxyl number of 54, 12.0 parts by weight of 1,4-butanediol, and 1.0 part by weight of 1 2,2',6,6'-tetraisopropyl-diphenyl-carbodiimide was heated to 80° C. and was intensively mixed with 46.3 parts by weight of 4,4'-diphenylmethane-diisocyanate at 50° C. in a mixing head at a temperature of 80° C. to 100° C. The resultant reaction mixture was applied to a polyurethane foil covered, heated, steel band which ran in an insulated housing. At the end of the steel band the reaction mixture had solidified. At a temperature of 120° C. to 150° C. the reaction mixture together with the polyurethane foil was continuously fed into a single shaft extruder having a diameter of 200 millimeters with housing temperatures in the feed area of 160° C. to 170° C. in the center zone of 170° C. to 200° C. and in a discharge area of 180° C. to 210° C., and the melt being discharged at the nozzle plate was finished in a nitrogen atmosphere by die-face granulation and subsequent water cooling. Using injection molding the opaque granules were processed into test samples on which the following mechanical properties were measured:

| | | |
|---|---|---|
| Hardness according to DIN 53 505 | Shore A: | 85 |
| Tensile Strength according to DIN 53 504 | [N/mm$^2$] | 52 |
| Breaking Elongation according to DIN 53 504 | [%] | 589 |
| Tear Propogation Resistance according to DIN 53 515 | | |
| Strips | [N/mm] | 42 |
| Graves | [N/mm] | 76 |
| Abrasion according to DIN 53 516 | [N/mm$^3$] | 37 |

The resultant polyurethane elastomer granules could be extruded into hose films.

The prepared molded parts were easily demoldable.

EXAMPLE 2

A mixture of 100 parts by weight of a polyethylene glycol-1,4-butanediol-adipate having a hydroxyl number of 57, 27 parts by weight of 1,4-butanediol and 1.0 parts by weight of 2,2',6,6'-tetraisopropyl-diphenyl-carbodiimide and 90 parts by 4,4'-diphenylmethane-diisocyanate were intensively mixed in accordance with the procedure of Example 1 and were applied to a polyurethane foil-covered, heated steel band. The solidified reaction mixture together with the polyurethane foil was continuously introduced into a single shaft extruder with diameter of 200 millimeters at a temperature of 140° C. to 180° C. The extruder had a housing temperature in the feed area of 170° C. to 190° C., in the center area of 190° C. to 220° C., and in the discharge area of 200° C. to 230° C. The discharged melt was finished by die-face granulation with subsequent water cooling. The resultant granules were processed into test bodies by injection molding and the following mechanical properties were measured on these test samples.

| | | |
|---|---|---|
| Hardness according to DIN 53 505 | Shore D: | 59 |

| -continued | | |
|---|---|---|
| Tensile Strength according to DIN 53 504 | [N/mm²] | 44 |
| Breaking Elongation according to DIN 53 504 | [%] | 420 |
| Tear Propogation Resistance according to DIN 53 515 | | |
| Strips | [N/mm] | 69 |
| Graves | [N/mm] | 158 |
| Abrasion according to DIN 53 516 | [N/mm³] | 33 |

Molded parts prepared from the polyurethane elastomer granules were easily demolded.

The embodiments of the invention in which an exclusive privilege or property is claimed are defined as follows:

1. A process for the preparation of thermoplastic polyurethane elastomers by reacting
   (a) organic diisocyanates,
   (b) polyhydroxyl compounds with molecular weights of 500 to 8000 and
   (c) chain extenders with molecular weights of 60 to 400 in the presence of
   (d) catalysts at temperatures from 60° C. to 250® C. wherein the reaction is carried out in two stages with the first reaction stage consisting of mixing components (a) through (d) continuously, applying the reaction mixture to a thermoplastic foil covered conveyor band and allowing it to react until it solidifies and subsequently in a second reaction stage melting in an extruder the solidified reaction mixture together with the thermoplastic foil while completing the reaction and subsequently extruding and granulating said melt.

2. The process of claim 1 wherein
   (e) auxiliaries and/or
   (f) additives are also used as components.

3. The process of claim 1 wherein the reaction temperature in the first reaction stage is 60° C. to 200° C. and in the second reaction stage, 140° C. to 250° C.

4. The process of claim 1 wherein more than 50 mole percent of the diisocyanate are reacted in the first reaction stage.

5. The process of claim 1 wherein the thermoplastic foil consists of a thermoplastic polyurethane or polyamide.

6. The process of claim 1 wherein the extruded polyurethane elastomer is granulated directly in an inert gas atmosphere by means of hot strand granulating.

7. The process of claim 1 wherein essentially linear polyester polyols of adipic acid and diols with 2 to 6 carbon atoms, polycaprolactone and/or polytetrahydrofuran are used as polyhydroxyl compounds.

8. The process of claim 1 wherein 4,4'-diphenylmethane diisocyanate or 1,5-naphthylene diisocyanate are used as organic diisocyanates.

* * * * *